Patented Jan. 19, 1954

2,666,750

UNITED STATES PATENT OFFICE 2,666,750

POLYMERIC PHOSPHONIC ACID DIAMIDES

Joseph B. Dickey and Harry W. Coover, Jr., Kingsport, Tenn., assignors to Eastman Kodak Company, Rochester, N. Y., a corporation of New Jersey No Drawing. Application February 2, 1951, Serial No. 209,198

12 Claims. (Cl. 260—2)

This invention relates to resinous polyphosphonic acid diamides and to a process for their preparation.

It is known that organo-phosphonic acid diamides are relatively stable compounds. For example, alpha, beta-ethylenically unsaturated phosphonic acid diamides do not homopolymerize to resinous products even in the presence of polymerization catalysts of the type usually employed for the polymerization of ethylenically unsaturated compounds, that is, peroxide type catalysts. It was therefore surprising to find that such compounds can be homocondensed or co-condensed to resinous products by heating the compounds substantially above their melting points. Such products are characterized by not supporting combustion, by having very high softening points and by good solubilities in common volatile solvents. They can also be molded or extruded or coated from their solutions to give flexible, tough films.

The new class of resinous compounds of the invention possess in each case the characteristic features in the polymer chain of a plurality of phosphonamide groups

wherein R is a monovalent hydrocarbon radical from the group consisting of an alkyl group containing from 1 to 4 carbon atoms (e. g. methyl, ethyl, propyl, butyl, etc. groups), an aryl group (e. g. phenyl or tolyl groups) and an alkenyl group containing from 3 to 7 carbon atoms (e. g. an allyl group, a pentene group, and a heptene group, etc.) and $R_1$ represents an atom of hydrogen or an alkyl group containing from 1 to 4 carbon atoms. The products formed are linear polymers of hydrocarbon-phosphonic acid diamides containing the above recurring structural unit. The condensations can be carried out satisfactorily by heating the organo-phosphonic acid diamides at from 200° to 350° C. However, temperatures as low as 150° C. give satisfactory results with diamides which are liquid at this temperature, and good results are also obtainable at temperatures as high as 400° C. The solubilities of the resultant polymers are dependent upon their composition and molecular weights. In general, the low molecular weight polymers are soluble in solvents such as acetone and acetonitrile. The higher molecular weight polymers are soluble in solvents such as dimethyl acetamide and dimethyl formamide. The softening points of polymers are also dependent upon the polymer composition and molecular weight. In general, the polymeric N-substituted phosphonic acid diamides have softening points above 150° C. The unsubstituted polymeric phosphonic acid diamides have softening points above 225° C.

It is, accordingly, an object of our invention to provide the above described new class of resinous compounds. Another object is to provide a method for their preparation. Other objects will become apparent hereinafter.

The intermediates employed for the preparation of the above described polymers are readily prepared by reacting the desired organo-phosphonic acid with thionyl chloride or phosphorus pentachloride to yield the corresponding dichloride by the following reaction:

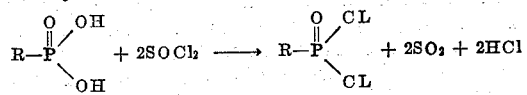

The preparation of the acid chloride can conveniently be carried out in such solvents as benzene, toluene and hydrocarbons. The reaction can also be carried out in the absence of such inert solvent. While either thionyl chloride or phosphorus pentachloride will react with phosphonic acids at room temperature, the reaction can be greatly speeded up by carrying it out at about 70° C. The desired phosphonic acid dichloride prepared as above is then reacted with ammonia or monosubstituted amines to give the corresponding diamide by the following reaction:

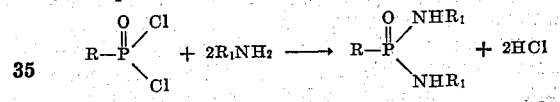

wherein R and $R_1$ have the previously defined meanings. The reaction between the phosphonic acid dichlorides and amines is carried out by the slow addition of the dichloride to an excess of the amine. The reactor must be surrounded by a cooling bath. The reaction is substantially over when the addition is complete. The excess amine is removed by distillation, the mixture remaining is diluted with ether or some other inert solvent and filtered to remove amine hydrochloride. The filtrate is freed from the solvent and the residue distilled or crystallized depending on the properties of the diamide. The above reaction can also be carried out with the amine dissolved in a solvent such as ether, chloroform, and so forth. In some cases, the simple diamides can be prepared by simply reacting the desired phosphonic acid dichloride with aqueous ammonia. In general, the reaction is best carried out at 0° C. or below. The simple diamides are usually high melting solids, while the N,N¹-substituted diamides are low melting solids to viscous oils. The alkenyl phosphonic acid diamides can also be prepared as described by L. A. Hamilton, U. S. Patent 2,382,309, dated August 14, 1945. Suitable amines for reaction with the various organophosphonic acid dichlorides to give the diamide intermediates from which the polymers of the invention are prepared include methylamine, ethylamine, n-propylamine, isopropylamine and the various monobutylamines.

The following examples will serve further to illustrate the new class of resinous compounds of the invention, and the manner of preparing the same.

*Example 1.—Homocondensate of ethane phosphonic acid diamide*

110 g. (1 mol) of ethane phosphonic acid were heated with 600 g. (5 mol) of thionyl chloride at 70° C. for a period of 14 hours. Distillation of the mixture gave a good yield of ethane phosphonic acid dichloride ($C_2H_5POCl_2$) B. P. 75°–83° C./4° mm. pressure.

15 g. (approx. 0.1 mol) of ethane phosphonic acid dichloride prepared as above were slowly dropped into 200 cc. (approx. 15 mol of $NH_3$) of liquid ammonia in a flask equipped with a stirrer, Dry Ice reflux condenser and a dropping funnel. After the addition was completed, the excess ammonia was allowed to evaporate. The residue was removed by the addition of 200 cc. of concentrated ammonium hydroxide which formed a slurry. The slurry was filtered and the filtered product was recrystallized from ethanol. The product was ethane phosphonic acid diamide [$C_2H_5PO(NH_2)_2$] which had a melting point of 180–185° C.

10 g. of the above diamide compound was slowly heated to 250° C. in a round-bottom flask in an atmosphere of nitrogen. Heating was continued for several hours. Upon cooling, the viscous mass solidified to a clear, hard polymer, which had a softening point above 200° C., which was moldable and which was soluble in acetonitrile.

*Example 2.—Homocondensate of $N,N^1$-dimethyl ethane phosphonic acid diamide*

15 g. (approx. 0.1 mol) of ethane phosphonic acid dichloride prepared as in Example 1 were slowly added to 25 g. (approx. 0.5 mol) of methylamine at a temperature below —10° C. The mass was warmed gently to remove excess methylamine, diluted with 100 g. of ether, and then filtered to remove the methylamine hydrochloride. The ether was removed from the filtrate by distillation. The residual oil contained 22.2% by weight of phosphorus compared with a calculated theoretical of 22.8% indicating thereby that a practically pure $N,N^1$-dimethyl ethane phosphondiamide [$C_2H_5PO(NHCH_3)_2$] had been obtained.

10 g. of the above prepared $N,N^1$-dimethyl ethane phosphondiamide were slowly heated to 250° C. in a round-bottomed flask in an atmosphere of nitrogen. Heating was continued for several hours. Upon cooling, the viscous mass solidified to a clear, hard polymer, which had a softening point above 150° C., which was moldable and which was soluble in acetone and acetonitrile.

*Example 3.—Homocondensate of butane phosphonic acid diamide*

138 g. (1 mol) of butane phosphonic acid were heated with 600 g. (5 mol) of thionyl chloride at 70° C. for a period of 16 hours. Distillation of the mixture gave a good yield of butane phosphonic acid dichloride ($C_4H_9POCl_2$) B. P. 97°–105° C./40 mm. pressure.

17 g. (approx. 0.1 mol) of butane acid dichloride prepared as above were slowly dropped into 200 cc. (approx. 15 mol $NH_3$) of liquid ammonia in a flask equipped with a stirrer, Dry Ice reflux condenser and a dropping funnel. After the addition was completed, the excess ammonia was allowed to evaporate. The residue was removed with the addition of 200 cc. of concentrated aqueous ammonium hydroxide which formed a slurry. The slurry was filtered and the filtered product was recrystallized from ethanol. The product was butane phosphonic acid diamide

[$C_4H_9PO(NH_2)_2$]

which had a melting point of 170° to 175° C.

10 g. of the above prepared diamide compound was slowly heated to 250° C. in a round-bottom flask in an atmosphere of nitrogen. Heating was continued for several hours. Upon cooling, the viscous mass solidified to a clear, hard polymer, which had a softening point above 200° C., which was moldable and which was soluble in dimethyl acetamide.

*Example 4.—Co-condensate of methane phosphonic acid diamide and ethane phosphonic acid diamide*

A mixture of 10 g. of methane phosphonic acid diamide and 10 g. of ethane phosphonic acid diamide, prepared by reacting methane phosphonic acid dichloride with liquid ammonia and reacting ethane phosphonic acid dichloride with liquid ammonia in general as described in Example 1, was slowly heated to 250° C. in a round-bottom flask in an atmosphere of nitrogen. Heating was continued for several hours. Upon cooling, the viscous mass solidified to a clear, hard polymer. The polymer had a softening point above 220° C., was readily moldable and was soluble in acetone.

*Example 5.—Homocondensate of benzene phosphonic acid diamide*

20 g. of benzene phosphonic acid diamide, prepared by reacting benzene phosphonic acid dichloride with liquid ammonia in general as in Example 1, were placed into a small round-bottom flask. Nitrogen gas was slowly bubbled through the flask as it was heated at 200°–210° C. in a metal bath. After the initial reaction had subsided, the temperature was slowly raised to 250° C. This temperature was maintained for several hours. Upon cooling, the viscous mass solidified to a clear, hard, glassy polymer. Continued heating at 250° C. and higher, under reduced pressure resulted in a further increase in molecular weight of the product. The polymer had a softening point above 225° C. It was readily moldable and gave coatable compositions in ethanol solution.

*Example 6.—Homocondensate of $N,N^1$-dimethyl benzene phosphondiamide*

20 g. (approx. 0.1 mol) of benzene phosphonic acid dichloride was slowly added to 100 cc. (approx. 2.3 mol) of liquid methylamine at a temperature below —10° C. After the addition was completed, 100 cc. of benzene were added, and the reaction mixture was slowly heated to 60° C. After cooling, the precipitated methylamine hydrochloride which formed was filtered off. The benzene was removed from the filtrate by distillation, and the residual product obtained as a light yellow viscous oil. The oil contained 16.4% by weight of phosphorus compared with the calculated theory of 16.86% for N,N¹-dimethyl benzene phosphondiamide.

10 g. of the above prepared N,N¹-dimethyl benzene phosphondiamide were placed in a round-bottom flask under an atmosphere of nitrogen and slowly heated to 250° C. The heating was continued at this temperature for several hours. Upon cooling, there was obtained a clear, hard polymer which had a softening point above 175° C., was moldable and was soluble in acetone and dimethly formamide.

*Example 7.—Homocondensate of N,N¹-dimethyl propene-2-phosphonic acid diamide*

10 g. of N,N¹-dimethyl 1-propene-2-phosphonic acid diamide, prepared by reacting 1-propene-2-phosphonic acid with methylamine (described in U. S. Patent 2,382,309, L. A. Hamilton, dated August 14, 1945), were heated slowly in a round-bottom flask to 270° C. This temperature was maintained for several hours. Upon cooling, the viscous mass solidified to a clear, hard polymer which had a softening point above 150° C. and was soluble in acetone.

In place of the N,N¹-dimethyl-1-propene-2-phosphonic acid diamide in the above example, there can be substituted an equivalent amount of other N,N¹-disubstituted alkenyl phosphonic acid diamides such as, for example, N,N¹-dimethyl 2-pentene-3-phosphonic acid diamide or N,N¹-dimethyl 3-heptene-4-phosphonic acid diamide, which similarly undergo condensation to resinous products on heating them above their melting points. The above mentioned diamides can be prepared from the corresponding acid dichloride by reaction with methylamine. Other monoalkylamines such as ethylamine, n-propylamine, n-butylamine, etc. can also be employed to give the corresponding N,N¹-dialkyl substituted diamides.

*Example 8.—Homocondensate of 1-propene-2-phosphonic acid diamide*

10 g. of propene-2-phosphonic acid diamide, prepared by reacting 1-propene-2-phosphonic acid dichloride with ammonia (described in U. S. Patent 2,382,309, L. A. Hamilton, dated August 14, 1945), were placed in a round-bottom flask and heated slowly to 250° C. This temperature was maintained for several hours under a vacuum of 2 mm. of mercury. Upon cooling, the clear, viscous mass solidified to a hard polymer, which had a softening point above 200° C. and was soluble in dimethyl acetamide. In place of the propene-2-phosphonic acid dichloride in the above example, there can be substituted an equivalent amount of other alkenyl phosphonic acid dichlorides to give with ammonia the corresponding diamides. For example, 2-pentene-3-phosphonic acid dichloride gives with ammonia 2-pentene-3-phosphonic acid diamide, 3-heptene-4-phosphonic acid dichloride gives with ammonia 3-heptene-4-phosphonic acid diamide. The above mentioned diamides similarly undergo condensation to resinous products on heating them above their melting points.

By proceeding as described in the preceding examples resinous condensation and co-condensation polymers of other organo-phosphonic acid diamides can be prepared such as, for example, the condensation polymers of methane phosphonic acid diamide, N,N¹-dimethyl methane phosphonic acid diamide, N,N¹-dibutyl ethane phosphonic acid diamide, propane phosphonic acid diamide, N,N¹-dimethyl propane phosphonic acid diamide, N,N¹-diethyl benzene phosphonic acid diamide, N,N¹-dipropyl benzene, phosphonic acid diamide, toluene phosphonic acid diamide, N,N¹-dimethyl toluene phosphonic acid diamide, and the like. One or more of the mentioned diamides can be co-condensed together to give generally similar polymers.

What we claim is:

1. A process for preparing a resinous polymer of a phosphonic acid diamide comprising heating at a temperature of from 150° to 400° C., a monomeric phosphonic acid diamide having the general formula:

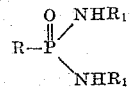

wherein R represents a member selected from the group consisting of an alkyl group containing from 1 to 4 carbon atoms, a phenyl group and an alkenyl group containing from 3 to 7 carbon atoms and R₁ is selected from the group consisting of an atom of hydrogen and an alkyl group containing from 1 to 4 carbon atoms.

2. A process for preparing a resinous polymer of benzene phosphonic acid diamide which comprises heating monomeric benzene phosphonic acid diamide at a temperature of from 200° to 350° C.

3. A process for preparing a resinous polymer of ethane phosphonic acid diamide which comprises heating monomeric ethane phosphonic acid diamide at a temperature of from 200° to 350° C.

4. A process for preparing a resinous polymer of butane phosphonic acid diamide which comprises heating monomeric butane phosphonic acid diamide at a temperature of from 200° to 350° C.

5. A process for preparing a resinous polymer of 1-propene-2-phosphonic acid diamide which comprises heating monomeric 1-propene-2-phosphonic acid diamide at a temperature of from 200° to 350° C.

6. A process for preparing a resinous polymer of N,N'-dimethyl-1-propene-2-phosphonic acid diamide which comprises heating monomeric N,N'-dimethyl-1-propene-2-phosphonic acid diamide at a temperature of from 200° to 350° C.

7. A resinous polymer obtained by the process of claim 1.

8. A resinous polymer obtained by the process of claim 2.

9. A resinous polymer obtained by the process of claim 3.

10. A resinous polymer obtained by the process of claim 4.

11. A resinous polymer obtained by the process of claim 5.

12. A resinous polymer obtained by the process of claim 6.

JOSEPH B. DICKEY.
HARRY W. COOVER, Jr.

References Cited in the file of this patent

UNITED STATES PATENTS

| Number | Name | Date |
|---|---|---|
| 2,382,309 | Hamilton | Aug. 14, 1945 |

OTHER REFERENCES

Michaelis, Justus Liebig's Annalen der Chemie, vol. 407, pages 290, 316 to 324, 1915.